(12) United States Patent
Cheng

(10) Patent No.: US 11,304,549 B2
(45) Date of Patent: Apr. 19, 2022

(54) CUP

(71) Applicant: Misaine Innovation Taiwan Co., Ltd., Taipei (TW)

(72) Inventor: Benjamin Cheng, Rolling Hills, CA (US)

(73) Assignee: Misaine Innovation Taiwan Co., Ltd., Taipei (TW)

( * ) Notice: Subject to any disclaimer, the term of this patent is extended or adjusted under 35 U.S.C. 154(b) by 239 days.

(21) Appl. No.: 16/660,575

(22) Filed: Oct. 22, 2019

(65) Prior Publication Data

US 2020/0121103 A1   Apr. 23, 2020

(30) Foreign Application Priority Data

Oct. 22, 2018   (CN) .......................... 201821708833.3

(51) Int. Cl.
  *B65D 25/28* (2006.01)
  *A47G 19/22* (2006.01)

(52) U.S. Cl.
  CPC .............................. *A47G 19/2205* (2013.01)

(58) Field of Classification Search
  CPC .. A47G 19/225; A47G 23/0216; B65D 25/28; Y10T 16/4707; Y10T 16/469; A47J 45/07; A47J 45/10
  USPC ............... 220/710.5, 759; 294/34, 37.1, 31.2
  See application file for complete search history.

(56) References Cited

U.S. PATENT DOCUMENTS

| | | | | |
|---|---|---|---|---|
| 3,252,728 A | * | 5/1966 | Holton | A47J 45/077 294/31.2 |
| 4,058,338 A | * | 11/1977 | Brown | A47J 45/077 294/31.2 |
| 6,341,714 B1 | | 1/2002 | Bogani | |
| 6,450,363 B1 | * | 9/2002 | Lin | A47G 19/2205 16/425 |
| 6,910,248 B2 | | 6/2005 | Fiocco | |
| 7,028,374 B2 | | 4/2006 | Fiocco | |
| 8,011,530 B2 | | 9/2011 | Kutsch et al. | |
| 8,261,414 B2 | | 9/2012 | Coudurier | |
| 8,370,995 B2 | | 2/2013 | Nelson et al. | |
| 8,402,610 B2 | | 3/2013 | Boes et al. | |
| 9,125,523 B2 | | 9/2015 | Bogani | |
| 9,492,034 B2 | | 11/2016 | Pan | |
| 2007/0289102 A1 | | 12/2007 | Kazaz et al. | |
| 2010/0288783 A1 | | 11/2010 | Park | |

(Continued)

*Primary Examiner* — King M Chu
(74) *Attorney, Agent, or Firm* — Knobbe Martens Olson & Bear LLP

(57) ABSTRACT

This application discloses a cup. The cup includes a cup body and a handle, a fixing block is fixedly connected to an outer peripheral wall of the cup body, and a top end of the handle is provided with a fixing connector configured to be detachably connected to the fixing block. Specifically, the fixing connector includes an accommodating slot configured to accommodate the fixing block and a rotary switch passing through the accommodating slot, and an end, facing the accommodating slot, of the fixing block is provided with a position-limiting retaining groove. When a portion, located in the accommodating slot is engaged in the position-limiting retaining groove, the handle is fixed to the cup body, and when the portion located in the accommodating slot is rotated to be able to disengage from the position-limiting retaining groove, the handle is removed from the cup body.

16 Claims, 3 Drawing Sheets

(56) References Cited

U.S. PATENT DOCUMENTS

2016/0360929 A1  12/2016  Tarenga et al.
2018/0070777 A1   3/2018  Dichraff et al.

* cited by examiner

A-A

CUP

CROSS-REFERENCE TO RELATED APPLICATIONS

This application claims priority to Chinese Patent Application No. 201821708833.3, titled "CUP", filed Oct. 22, 2018, the entire contents of which are incorporated herein by reference.

TECHNICAL FIELD

This application relates to the field of household appliances, in particular to a cup.

BACKGROUND

The cup in the prior art can be roughly classified into two types according to the relationship between the cup body and the handle, one is a cup in which the handle is detachably connected to the cup body, and the other is a cup in which the handle is non-detachably connected to the cup body.

For conventional cups in which the handle and the cup body are detachably connected, the handle is typically connected to the cup body by a bolt structure, and the user can selectively attach or remove the handle from the cup body as needed. However, this type of cup still has the following defects. First, when to replace the handle of this cup, it is required to use other tools (such as a screwdriver) to remove the fixing bolt first, and then can the handle be removed, which is very inconvenient. Second, after the bolt is removed, the inconvenience of bolt storage may cause inconvenience to the user in one aspect, and in another aspect, the bolt is apt to lose, which may cause the handle of the cup cannot be used any more. Third, the bolt structure is exposed to the air as part of the overall appearance of the cup, and long term use may cause the surface of the bolt structure to rust, which is not conducive to the overall aesthetics of the cup.

In view of the deficiencies of the prior art, those skilled in the art would like to find a cup that can facilitate the detachment of the handle from the cup body, to provide a more convenient use experience for the user.

SUMMARY

In order to facilitate the use of the user, a cup is proposed according to the present application, whose handle and cup body can be detached from each other more conveniently.

The cup according to the present application includes: a cup body and a handle, a fixing block is fixedly connected to an outer peripheral wall of the cup body, and a top end of the handle is provided with a fixing connector configured to be detachably connected to the fixing block. The fixing connector includes an accommodating slot configured to accommodate the fixing block and a rotary switch passing through the accommodating slot, and an end, facing the accommodating slot, of the fixing block is provided with a position-limiting retaining groove. When a portion, located in the accommodating slot, of the rotary switch is engaged in the position-limiting retaining groove, the handle is fixed to the cup body, and when the portion, located in the accommodating slot, of the rotary switch is rotated to be able to disengage from the position-limiting retaining groove, the handle is removed from the cup body.

Further, the position-limiting retaining groove includes a notch recessed toward the cup body and a retaining protrusion formed on an open end of the notch and configured to engage the rotary switch.

Further, the rotary switch includes a rotary shaft located in the accommodating slot and an operating handle connected to the rotary shaft and located outside the accommodating slot, the rotary shaft is provided with an engaging groove in a length direction thereof, so that when the engaging groove is located in the position-limiting retaining groove and a bottom wall of the engaging groove faces towards a bottom wall or a bottom side wall of the notch, the rotary shaft and the retaining protrusion interfere with each other, and when the engaging groove is located in the position-limiting retaining groove and the bottom wall of the engaging groove faces directly a side wall of the notch, the rotary shaft and the retaining protrusion do not interfere with each other.

Further, the open end of the notch includes a first end near the top of the cup body and a second end opposite to the first end, the retaining protrusion extends from one of the first end and the second end towards the other one thereof. The distance of an extending end of the retaining protrusion from the first end or the second end facing the extending end is equal to the difference between the diameter of the rotatory shaft and the depth of the engaging groove.

Further, the depth of the engaging groove is half of the diameter of the rotary shaft.

Further, an inner wall of the notch is configured as a curved surface adapted to a curved surface of the rotary shaft.

Further, the fixing block includes a fixing portion fixed to the cup body and a socket portion sleeved and fixed to an outer surface of the fixing portion, and the position-limiting retaining groove is formed in the socket portion.

Further, a cushioning member is provided on an inner wall of the accommodating slot.

Further, a bottom end of the handle is a free end.

Further, the material of the cup body and/or the handle is selected from one or more of ceramics, wood, and plastic.

When the cup is used according to the present application, it is not necessary to use other operating tools to detach or install the handle, and the fixation or removal of the handle from the cup can be realized by rotating the rotary switch; moreover, there is no extra loose parts in the process of detachment or installation of the handle to the cup body, the removed handle is easier to store, and the user is not troubled to store connecting members such as a bolt as in the prior art, thereby providing a more convenient use experience for the user. In addition, the user can select the cup bodies or handles of different materials to combine them for use according to personal preference, thereby further improving the user's comfort.

BRIEF DESCRIPTION OF THE DRAWINGS

In order to more clearly illustrate the embodiments of the present application or the technical solutions in the prior art, the drawings to be used in the description of the embodiments or the prior art are briefly described below. In all the drawings, like elements or parts are generally identified by like reference numerals. In the drawings, elements or parts are not necessarily drawn to scale.

DETAILED DESCRIPTION

The embodiments of the technical solutions of the present application are described in detail hereinafter with reference to the drawings. The following embodiments are only intended to more clearly illustrate the technical solutions of the present application, and therefore are only examples rather than being intended to limit the scope of the present application.

Figure 1:
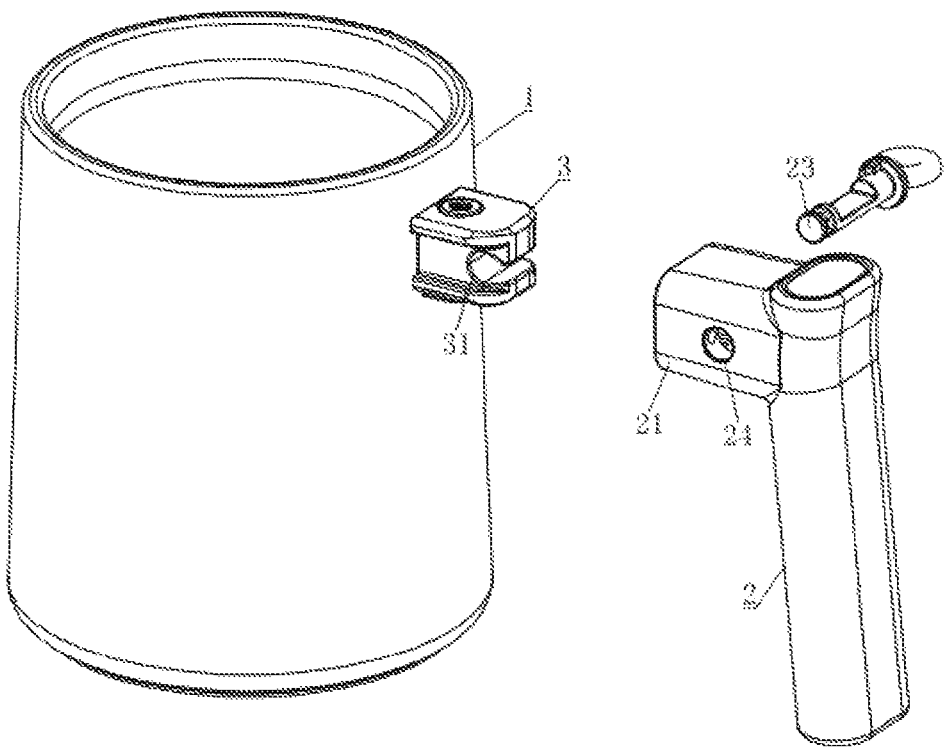
FIG. 1 is a schematic perspective view showing the structure of a cup according to the present application, with a handle being separated from a cup body.
Figure 2:
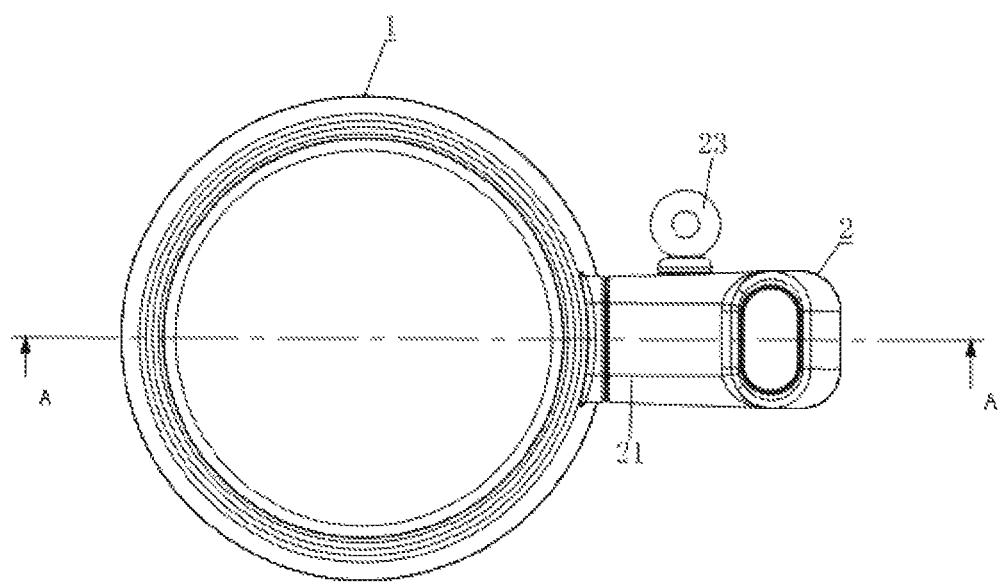
FIG. 2 is a top view of a cup according to the present application.
Figure 3:
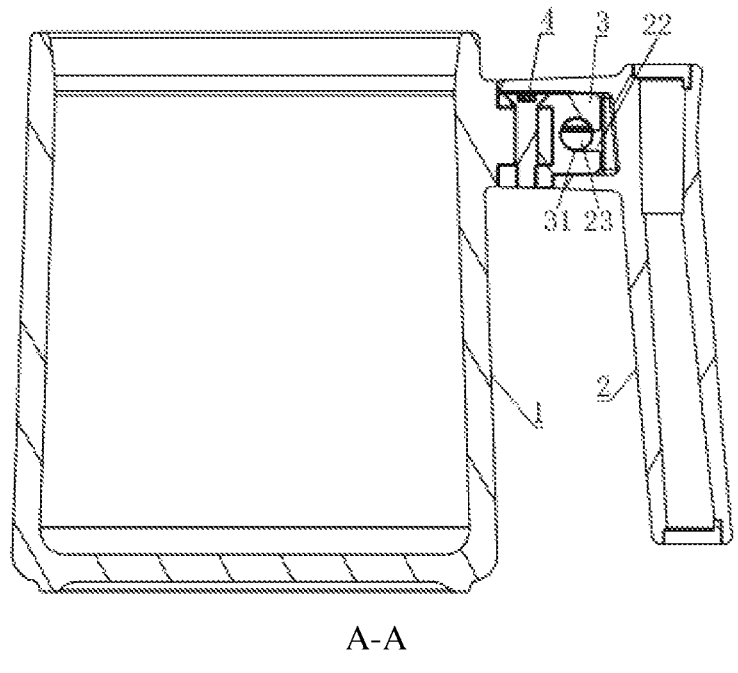
FIG. 3 is a sectional view of the cup in FIG. 2 taken along the line A-A.

FIG. 1 shows a schematic structural view of a cup 100 according to the present application. As shown in FIGS. 1 to 3, the cup 100 includes: a cup body 1 and a handle 2, and a fixing block 3 is fixedly connected to an outer peripheral wall of the cup body 1; and a top end of the handle 2 is provided with a fixing connector 21 configured to be detachably connected to the fixing block 3. The fixing connector 21 includes an accommodating slot 22 (shown in FIG. 3) configured to accommodate the fixing block 3 and a rotary switch 23 passing through the accommodating slot 22. An end, facing the accommodating slot 22, of the fixing block 3 is provided with a position-limiting retaining groove 31. Specifically, when a portion, located in the accommodating slot 22, of the rotary switch 23 is engaged in the position-limiting retaining groove 31, the handle 2 can be fixed to the cup body 1, and when the portion, located in the accommodating slot 22, of the rotary switch 23 is rotated to be able to disengage from the position-limiting retaining groove 31, the handle 2 can be removed from the cup body 1.

As shown in FIGS. 1 to 3, in the process of using the cup 100 according to the present application, when to install the handle 2, first, the fixing connector 21 is connected to the fixing block 3 by plugging, and in this case, the fixing block 3 is located in the accommodating slot 22 and the rotary switch 23 is accommodated in the position-limiting retaining groove 31. Then, the position of the rotary switch 23 with respect to the position-limiting retaining groove 31 is adjusted by rotating the rotary switch 23. When the rotary switch 23 is rotated such that it can be engaged in the position-limiting retaining groove 31, the handle 2 is fixed to the cup body 1; and when to remove the handle 2, the rotary switch 23 is further rotated to adjust the position of the rotary switch 23 with respect to the position-limiting retaining groove 31, and when the rotary switch 23 is rotated such that it is disengaged from the position-limiting retaining groove 31, the fixing connector 21 is pulled out with respect to the fixing block 3, so that the handle 2 is detached from the cup body 1.

When the cup 100 is used according to the present application, it is not necessary to use other operating tools to detach or install the handle 2, and the fixation or removal of the handle 2 from the cup body 1 can be realized simply by rotating the rotary switch 23; moreover, there is no additional loose parts in the process of detaching or installing the handle 2 to the cup body 1, and the removed handle 2 is easier to store, thus, the user is not troubled to store the connecting member such as the bolt as in the prior art. The removal of the handle 2 from the cup body 1 of the cup 100 according to the present application is more convenient, thereby providing a more convenient use experience for the user.

Figure 4:
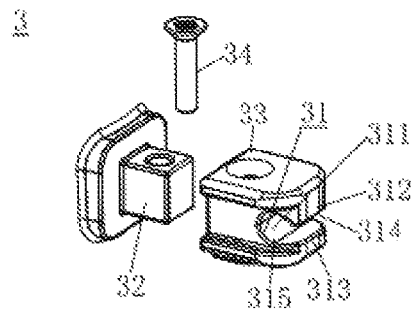
FIG. 4 is an exploded view showing the structure of a fixing block in FIG. 1.

In the embodiment shown in FIG. 4, the position-limiting retaining groove 31 may include: a notch 311 recessed toward the cup body 1; and a retaining protrusion 312 formed on an open end of the notch 311 and configured to engage the rotary switch 23. With this arrangement, when the rotary switch 23 is located in the position-limiting retaining groove 31 and is rotated such that it can be blocked by the retaining protrusion 312 to have its position limited, the fixing connector 21 is fixed onto the fixing block 3, thereby, the handle 2 is fixed to the cup body 1; and when the rotary switch 23 is located in the position-limiting retaining groove 31 and is rotated such that it cannot be blocked by the retaining protrusion 312, the fixing connector 21 can be pulled out with respect to the fixing block 3, thereby, the handle 2 is removed from the cup body 1.

Figure 5:
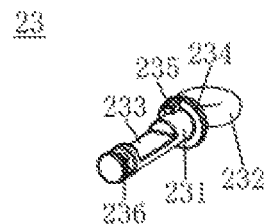
FIG. 5 is a schematic view showing the structure of a rotary switch in FIG. 1.

According to the present application, as shown in FIG. 5, the rotary switch 23 may include: a rotary shaft 231 located in the accommodating slot 22; and an operating handle 232 connected to the rotary shaft 231 and located outside the accommodating slot 22. The rotary shaft 231 is provided with an engaging groove 233 in a length direction thereof, so that when the engaging groove 233 is located in the position-limiting retaining groove 31 and a bottom wall of the engaging groove 233 faces towards a bottom wall or bottom side wall of the notch 311, the rotary shaft 231 and the retaining protrusion 312 interfere with each other, and when the engaging groove 233 is located in the position-limiting retaining groove 31 and the bottom wall of the engaging groove 233 faces directly a side wall of the notch 311, the rotary shaft 231 and the retaining protrusion 312 do not interfere with each other.

As shown in FIGS. 1 to 3, the rotary switch 23 preferably passes transversely through the accommodating slot 22, and the rotary shaft 231 may be rotatably coupled to the fixing connector 21 through a first channel 24 running transversely through outer walls of the accommodating slot 22, and the operating handle 232 can drive the rotary shaft 231 to rotate in the first channel 24. By providing the rotary shaft 231 with the engaging groove 233 in the longitudinal direction thereof, the rotary shaft 231 itself is enabled to have different vertical heights in the position-limiting retaining groove 31 when the rotary shaft 231 is in different rotational positions. When the vertical height causes the rotary shaft 231 to be retained in the position-limiting retaining groove 31 by the retaining protrusion 312, i.e., when the bottom wall of the engaging groove 233 faces towards the bottom wall or bottom side wall of the notch 311, the rotary shaft 231 and the retaining protrusion 312 interfere with each other, thereby, the handle 2 is fixed to the cup body 1; and when the vertical height causes the rotary shaft 231 not to be retained in the position-limiting retaining groove 31 by the retaining protrusion 312, i.e., when the bottom wall of the retaining groove 233 directly faces towards either of side walls of the notch 311, the rotary shaft 231 and the retaining protrusion 312 do not interfere with each other, thereby, the handle 2 is removed from the cup body 1.

It is to be noted that the bottom wall of the notch 311 should be understood as a wall area opposite to the opening of the notch 311, and the side walls of the notch 311 should be understood as two side wall areas connected to the bottom wall of the notch 311; and the bottom wall of the engaging groove 233 should be understood as a wall area opposite to the opening of the engaging groove 233.

According to the present application, as shown in FIG. 4, the open end of the notch 311 may include: a first end 314 near the top of the cup body 1; and a second end 313 opposite to the first end 314. The retaining protrusion 312 may extend from one of the first end 314 and the second end 313 towards the other one thereof, and the distance of an extending end of the retaining protrusion 312 from the first end 314 or second end 313 facing the extending end is equal to the difference between the diameter of the rotary shaft 231 and the depth of the engaging groove 233. Taking the embodiment shown in FIG. 4 as an example, the retaining protrusion 312 extends from the first end 314 towards the second end 313, and the distance of the extending end of the retaining protrusion 312 from the second end 313 is equal to the difference between the diameter of the rotary shaft 231 and the depth of the engaging groove 233. With this arrangement, when the handle 2 can be removed from the cup body 1, for example, when the rotary shaft 231 is in a horizontal position as shown in FIG. 1, the engaging groove 233 of rotary shaft 231 can exactly not interfere with the retaining protrusion 312, and in this case, the bottom wall of the engaging groove 233 directly faces the side wall of the notch 311, and once the rotary shaft 231 is rotated, the engaging groove 233 of the rotatory shaft 231 can interfere with the retaining protrusion 312, thereby, the rotary shaft 231 is retained in the position-limiting retaining groove 31. The arrangement of the embodiment allows the handle 2 to be removed only when the rotary shaft 231 is at the horizontal position shown in FIG. 1, and the handle 2 cannot be removed when the rotary shaft 231 is in any other positions, which prevents the accident falling off of the handle 2 due to improper operation by the user during use.

Preferably, as shown in FIG. 5, the depth of the engaging groove 233 can be half of the diameter of the rotary shaft 231. With this arrangement, not only the strength of the rotary shaft 231 itself can be effectively ensured, but also the strength of engagement of the rotary shaft 231 with the retaining protrusion 312 in the position-limiting retaining groove 31 can be effectively ensured. It needs to be explained here that the depth of the engaging groove 233 should be understood as the vertical distance from the opening of the engaging groove 233 to the bottom wall of the engaging groove 233.

Further preferably, as shown in FIG. 4, an inner wall of the notch 311 may also be formed as a curved surface adapted to a curved surface of the rotary shaft 231. With this arrangement, the curved surface of the rotary shaft 231 is better matched with the inner surface of the position-limiting retaining groove 31, so that the rotary shaft 231 can be more closely fitted with the position-limiting retaining groove 31 on the basis that the rotary shaft 231 can be rotated in the position-limiting retaining groove 31, thereby effectively improving the strength and stability of the connection of the handle 2 to the cup body 1.

Figure 6:
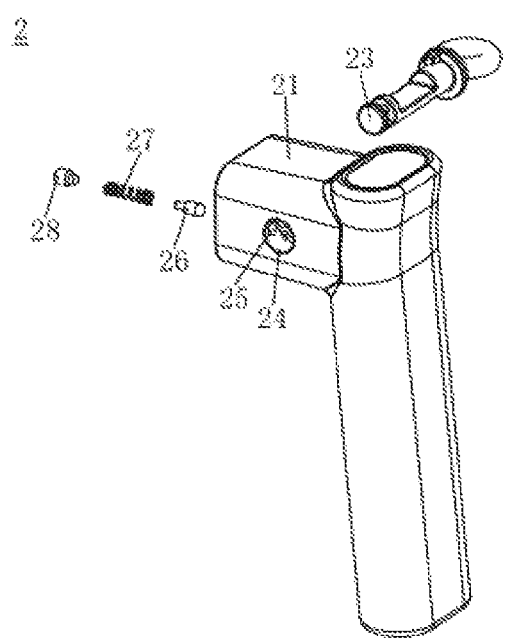
FIG. 6 is an exploded view showing the structure of the handle in FIG. 1.

According to the present application, as shown in FIG. 5, the rotary switch 23 may further include: a position-limiting flange 234 connected between the operating handle 232 and the rotary shaft 231; a position-limiting stop 235 connected to both the position-limiting flange 234 and the rotary shaft 231; and a fixing groove 236 provided at an end, away from the operating handle 232, of the rotary shaft 231. As shown in FIG. 6, the handle 2 may further include: a second channel 25 arranged in a side wall of the accommodating slot 22 and in communication with the first channel 24, with the axis of the second channel 25 being perpendicular to the axis of the first channel 24; a prop 26 arranged within the second channel 25 and configured to be fitted with the fixing groove 236 (shown in FIG. 5); and a spring member 27 configured to retain the prop 26 within the second channel 25 by a first fastener 28.

With the above arrangement, and as shown in FIG. 5 and FIG. 6, when to install the rotary switch 23 to the fixing connector 21, the rotary switch 23 may be passed through the first channel 24 first, and the position-limiting flange 234 can limit the position of the rotary shaft 231 in the process that the rotary shaft 231 is inserted into the first channel 24, and then the prop 26, the spring member 27 and the first fastener 28 may be installed into the second channel 25 in the listed sequence, and in this process, the prop 26 may withstand the fixing groove 236, and the rotary shaft 231 may be positioned in the accommodating slot 22 under the fastening action applied by the first fastener 28. The position-limiting stop 235 is configured to limit a maximum rotating angle of the rotary switch 23, to thereby facilitating the accurate rotating of the rotary switch 23 to a desired angle position when the user is to fix or remove the handle 2, which further facilitates the use of the rotary switch 23.

According to the present application, in the embodiment shown in FIG. 4, the fixing block 3 may further include: a fixing portion 32 fixed to the cup body 1; and a socket portion 33 sleeved and fixed to an outer surface of the fixing portion 32, the position-limiting retaining groove 31 being formed in the socket portion 33. The socket portion 33 may be fixed to the fixing portion 32 by a second fastener 34. With this arrangement, the difficulty in manufacturing the cup body 1 can be reduced in one aspect, and in another aspect, when the position-limiting retaining groove 31 in the socket portion 33 wears, a new socket portion 33 can be replaced more rapidly, thus further facilitating the use by the user.

As shown in FIG. 3, preferably, a cushioning member 4 may further be provided on an inner wall of the accommodating slot 22. With this arrangement, the cushioning member 4 may facilitate the reduction of abrasion between the inner wall of the accommodating slot 22 and an outer surface of the fixing block 3 in one aspect, and in another aspect, the cushioning member may have a certain sealing effect, thereby allowing a tight fit between the accommodating slot 22 and the fixing block 3, to prevent the handle 2 from shaking or prevent foreign matters from entering the handle 2.

Further preferably, in order to facilitate the gripping of the handle 2 by the user, a bottom end of the handle 2 can be configured as a free end.

Moreover, the material of the cup body 1 and/or the handle 2 may be selected from one or more of ceramics, wood, and plastic. With this arrangement, the technician can make cup bodies or handles of different materials as needed to provide more choices for the user, and the user can select cup bodies or handles of different materials to combine them for use according to personal preference.

Finally, it should be noted that the above embodiments are only intended for illustrating the technical solutions of the present application rather than limiting the present application thereto. Although the present application has been described in detail with reference to the foregoing embodiments, the ordinary person skilled in the art should be understood that the technical solutions described in the foregoing embodiments may be modified, or some or all of the technical features therein may be equivalently substituted; and the modifications or substitutions do not make the essence of the corresponding technical solutions deviate from the scope of the technical solutions of the various embodiments of the present application, and they should be included in the scope of the claims and the description of the present application. In particular, the technical features mentioned in the various embodiments can be combined in any manner as long as there is no structural conflict. The present application is not limited to the specific embodiments disclosed herein, but includes all technical solutions falling within the scope of the claims.

What is claimed is:

1. A cup comprising:
   a cup body, wherein a fixing block is fixedly connected to an outer peripheral wall of the cup body; and
   a handle, wherein a top end of the handle is provided with a fixing connector configured to be detachably connected to the fixing block,
   wherein the fixing connector comprises an accommodating slot configured to accommodate the fixing block and a rotary switch passing through the accommodating slot, and an end, facing the accommodating slot, of the fixing block is provided with a position-limiting retaining groove, wherein, when a portion, located in the accommodating slot, of the rotary switch is engaged in the position-limiting retaining groove, the handle is fixed to the cup body, and when the portion, located in the accommodating slot, of the rotary switch is rotated to be able to disengage from the position-limiting retaining groove, the handle is removed from the cup body;
   wherein the position-limiting retaining groove comprises a notch recessed toward the cup body and a retaining protrusion formed on an open end of the notch and configured to engage the rotary switch.

2. The cup according to claim 1, wherein the rotary switch comprises a rotary shaft located in the accommodating slot and an operating handle connected to the rotary shaft and located outside the accommodating slot, the rotary shaft is provided with an engaging groove in a length direction thereof, so that when the engaging groove is located in the position-limiting retaining groove and a bottom wall of the engaging groove faces towards a bottom wall or a bottom side wall of the notch, the rotary shaft and the retaining protrusion interfere with each other, and when the engaging groove is located in the position-limiting retaining groove and the bottom wall of the engaging groove faces directly a side wall of the notch, the rotary shaft and the retaining protrusion do not interfere with each other.

3. The cup according to claim 2, wherein the open end of the notch comprises a first end near the top of the cup body and a second end opposite to the first end, the retaining protrusion extends from one of the first end and the second end towards the other one thereof, and the distance of an extending end of the retaining protrusion from the first end or the second end facing the extending end is equal to the difference between the diameter of the rotatory shaft and the depth of the engaging groove.

4. The cup according to claim 3, wherein the depth of the engaging groove is half of the diameter of the rotary shaft.

5. The cup according to claim 4, wherein an inner wall of the notch is configured as a curved surface adapted to a curved surface of the rotary shaft.

6. The cup according to claim 3, wherein an inner wall of the notch is configured as a curved surface adapted to a curved surface of the rotary shaft.

7. The cup according to claim 2, wherein an inner wall of the notch is configured as a curved surface adapted to a curved surface of the rotary shaft.

8. The cup according to claim 2, wherein the fixing block comprises a fixing portion fixed to the cup body and a socket portion sleeved and fixed to an outer surface of the fixing portion, and the position-limiting retaining groove is formed in the socket portion.

9. The cup according to claim 2, wherein a bottom end of the handle is a free end.

10. The cup according to claim 2, wherein the material of the cup body and/or the handle is selected from one or more of ceramics, wood, and plastic.

11. The cup according to claim 2, wherein a cushioning member is provided on an inner wall of the accommodating slot.

12. The cup according to claim 1, wherein the fixing block comprises a fixing portion fixed to the cup body and a socket portion sleeved and fixed to an outer surface of the fixing portion, and the position-limiting retaining groove is formed in the socket portion.

13. The cup according to claim 1, wherein a cushioning member is provided on an inner wall of the accommodating slot.

14. The cup according to claim 1, wherein a bottom end of the handle is a free end.

15. The cup according to claim 1, wherein the material of the cup body and/or the handle is selected from one or more of ceramics, wood, and plastic.

16. A cup comprising:
   a cup body, wherein a fixing block is fixedly connected to an outer peripheral wall of the cup body; and
   a handle, wherein a top end of the handle is provided with a fixing connector configured to be detachably connected to the fixing block,
   wherein the fixing connector comprises an accommodating slot configured to accommodate the fixing block and a rotary switch passing through the accommodating slot, and an end, facing the accommodating slot, of the fixing block is provided with a position-limiting retaining groove, wherein, when a portion, located in the accommodating slot, of the rotary switch is engaged in the position-limiting retaining groove, the handle is fixed to the cup body, and when the portion, located in the accommodating slot, of the rotary switch is rotated to be able to disengage from the position-limiting retaining groove, the handle is removed from the cup body;
   wherein the fixing block comprises a fixing portion fixed to the cup body and a socket portion sleeved and fixed to an outer surface of the fixing portion, and the position-limiting retaining groove is formed in the socket portion.

* * * * *